(No Model.) 2 Sheets—Sheet 1.

P. GEYER.
HORSE DETACHER.

No. 386,877. Patented July 31, 1888.

WITNESSES.
Miller C. Ammon.
Ida F. Kinsey.

INVENTOR.
Philip Geyer.
per W. J. Stewart
Atty.

(No Model.) 2 Sheets—Sheet 2.

P. GEYER.
HORSE DETACHER.

No. 386,877. Patented July 31, 1888.

WITNESSES
Miller C. Ammon.
Ida F. Kinsey.

INVENTOR
Philip Geyer.
per- W. J. Stewart
atty.

United States Patent Office.

PHILLIP GEYER, OF READING, PENNSYLVANIA, ASSIGNOR OF ONE-HALF TO REINHARD RIEGER, OF SAME PLACE.

HORSE-DETACHER.

SPECIFICATION forming part of Letters Patent No. 386,877, dated July 31, 1888.

Application filed August 27, 1887. Serial No. 248,023. (No model.)

*To all whom it may concern:*

Be it known that I, PHILLIP GEYER, a citizen of the United States, residing at Reading, in the county of Berks and State of Pennsylvania, have invented certain new and useful Improvements in Safety Apparatus for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicle attachments adapted to allow the driver to quickly and safely release the horse from the vehicle in case of a runaway, or for other purposes, and also provides a means of supporting the shafts, so as to prevent them striking the ground when not supported by the horse.

My object is to insure the safety of persons in a vehicle in case the horse or horses should, from any cause, get beyond the control of the driver.

The danger of life and limb in case an attempt is made to jump from a vehicle when it is carried along at a rapid rate by a runaway horse is about equaled by the risk run in staying in the vehicle without knowing what may happen to it in its headlong course. By means of the apparatus described below the driver may in a moment free the horse from the shafts, thus allowing him to run with slight danger of injuring himself, and leaving the carriage and its occupants behind.

Figure 1:
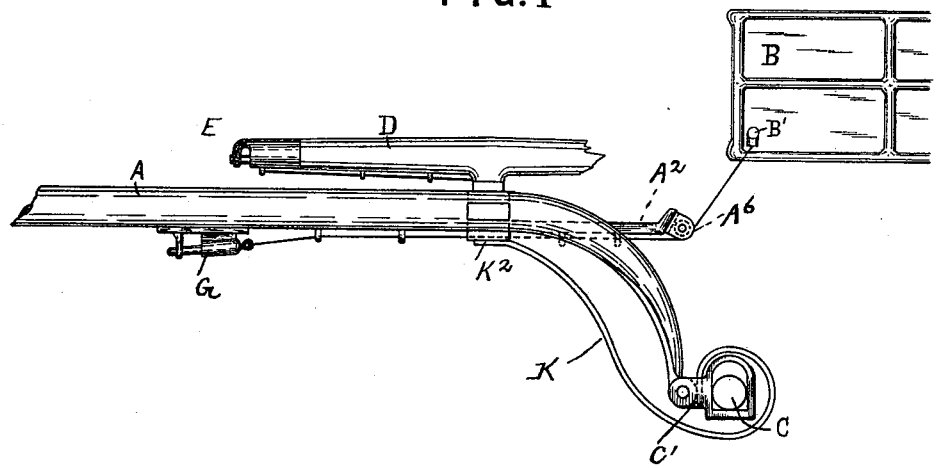
Figure 2:
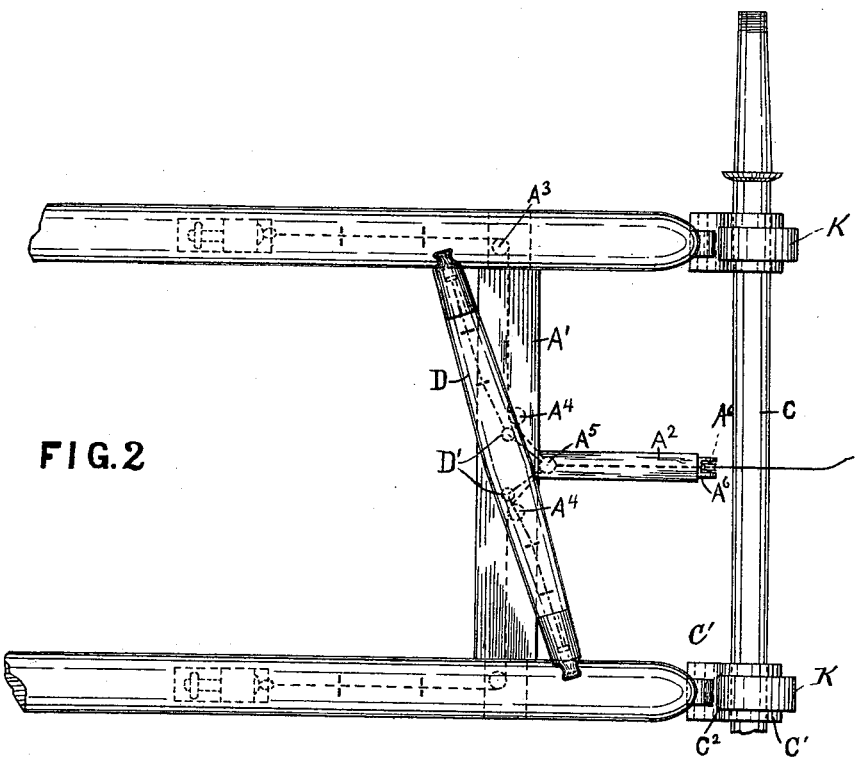
Figure 3:
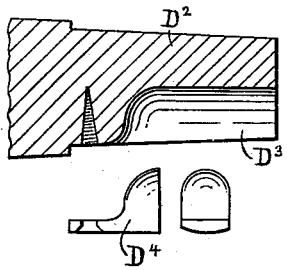
Figure 4:
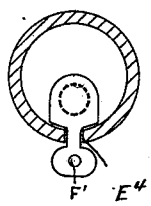
Figure 6:
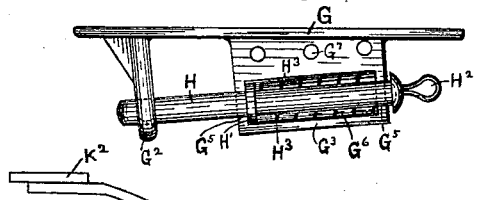
Figure 7:
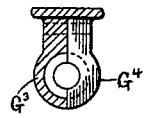
Figure 8:
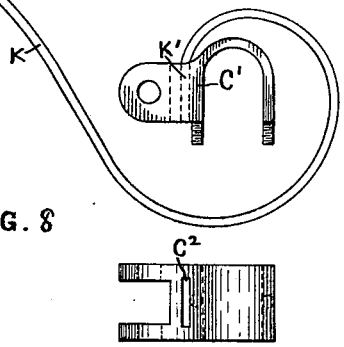

Figure 1 is a side elevation showing the shafts connected to the fore axle of a vehicle and my apparatus attached to the shafts and connected with the body. The singletree is swung around parallel with the shafts, so as to better show the apparatus. Fig. 2 is a plan of the same, showing clearly the arrangements of the parts and the manner of running and connecting the cords. The body of the vehicle is removed. Figs. 3 and 4 show the end of the singletree ready to receive the singletree-hook, which latter is constructed as shown in in Figs. 5 and 4. Fig. 6 shows, in side elevation, the special breeching-hook with the side plate removed. The latter is shown in the end view, Fig. 7. Fig. 8 shows, in side view and plan, a thill-coupling with the shaft-supporting spring attached.

In the drawings, A represents the shaft; B, the body of the vehicle; C, the fore axle; D, the singletree; E, the singletree-hook; G, the breeching-hook; C', the thill-coupling, and K the shaft-supporting spring.

A' is the singletree-supporting bar; $A^2$, an extension-arm from the supporting-bar to guide the operating-cord back to the body.

$A^3$ are pulleys, around which the operating-cords for the breeching-hooks are guided.

$A^4$ are holes in the singletree-support, through which the singletree-hook cords pass to connect underneath to a ring or equivalent device, $A^5$, to which ring the breeching-hook cords are also connected, and from which a single cord is carried underneath the extension-arm backward over the guide-pulley $A^6$ and thence through the bottom of the body or through the dash-board, and terminates in a suitable handle. I prefer to place the handle, when possible, in such a position that it may rest close against the dash-board, so as not to be in the way of the feet.

$C^2$ is a slot in the thill-coupling adapted to receive the end K' of the shaft-supporting spring K, which latter is wound around the fore axle and then carried upward until the end $K^2$ (which may be padded, as shown) is brought under the shaft at any desired point. D' are guide-pulleys for the singletree-hook cords.

Figure 5:
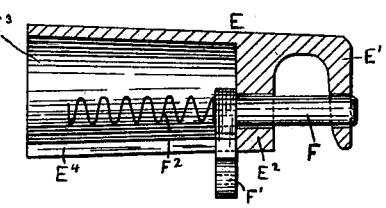

The ends of the singletree I prefer to form as shown in Figs. 3, 4, and 5, $D^2$ being slightly reduced in diameter to receive the socket $E^3$ of the singletree-hook, and $D^3$ being a recess adapted to receive the spiral spring $F^2$.

$D^4$ is a separate spring-piece, preferably of metal, adapted to be screwed in position to the singletree, so as to form a backing for the spring $F^2$ and at the same time allow the latter to be readily removed. The singletree-hook is provided with a main bearing, $E^2$, to guide the bar F, which latter is furnished with a cord-connection, F'. The end E' of the hook is adapted to support the bar when the latter is pushed outward by the spring. The slot $E^4$ allows the pin to be moved in and out and also serves to guide it.

The breeching-hook G is formed of a plate adapted to be secured to the bottom of the shaft by means of screws at G', and has a bracket, $G^2$, near one end and at a suitable distance therefrom adapted to suit the width of a breech-strap, the half bar-body $G^3$, integral with said plate and bracket, having bearings $G^5$ for the bar H and recess $G^6$ for the spring $H^3$, and adapted to have the separate side plate, G, secured thereto by means of screws at $G^7$. The bar H is formed with a collar, H', and its end has an eye, $H^2$, adapted to receive the cord.

The thill-coupling C' is of an ordinary form, but is shown with a slot, $C^2$, adapted to hold the shaft-supporting spring K. I prefer this method of connecting the spring, because it saves pieces and also brings the latter directly under the shafts, thus making it less noticeable. It may, however, be fastened by a separate connection to the axle in substantially the same manner.

The object of coiling the spring around the axle, as shown, is to make it more elastic. The spring bears against a plate on the bottom of the shaft, through which the cord is carried, thus protecting the latter from the spring.

The application and operation of my apparatus will be easily understood in view of the preceding explanation and the accompanying drawings. The shafts having been provided with the special breeching-hooks and the singletree with the special singletree-hooks, the respective cords are connected to the movable bars, and after running through screw-eyes and over the corner pulleys are finally connected together at $A^5$, and thence, after being guided along the extension-arm and over its end pulley, the operating-cord (or wire) is finally passed through the body and connected to a suitable handle. The spring K, previously attached, supports the shafts. The horse is hooked to the shafts in the ordinary manner, the only difference being that the bars F are passed through the slots in the traces, and that the breeching-strap should not be wound around the shaft, as is sometimes done. In case of a runaway or other emergency, the only thing necessary to be done to free the horse entirely from the vehicle and shafts is to pull the handle B', which draws back the bars in both the singletree and breeching hooks, thus releasing both the traces and the breeching straps. The shafts, no longer held up by the horse, are supported by the springs. I prefer, also, to use double reins buckled together where they may be easily disconnected, and so arranged that when unbuckled the free ends will be drawn through the bit-rings, thus leaving the reins in the hands of the driver.

My apparatus is evidently adapted to be used not only in case of a runaway, but whenever it is desired to quickly disconnect the horse from the vehicle. It is also adapted, with such modifications as will readily suggest themselves to an expert, to be applied to a vehicle arranged to be drawn by a pair of horses instead of one, as herein described.

Having fully described my apparatus and its operation, I desire to secure the following claims thereon:

1. In combination with the shafts, singletree, fore axle, and body of a vehicle, breeching-hooks G and singletree-hooks E, both provided with movable bars, and a series of cords and pulleys adapted to operate said bars from the body of the vehicle, substantially as and for the purpose described.

2. The vehicle shafts having breeching-hooks with movable bars and an extension-arm, $A^2$, in combination with cords adapted to operate said bars, substantially as set forth.

3. A breeching-hook for a vehicle, consisting of a plate adapted to be attached to the shafts of the same and formed integral with a perforated bracket, $G^2$, and body $G^3$, a spring, $H^3$, bar H with cord-connection $H^2$, and detachable plate $G^4$, substantially as shown.

4. In combination with a singletree having ends recessed at $D^3$, a hook consisting of a body with groove $E^4$ and a perforated hooked end, a movable bar with cord-arm F', adapted to be guided in said groove, a spring, $F^2$, and stop-piece $D^4$, substantially as set forth.

5. A safety apparatus for vehicles, consisting of shafts provided with extension-arm $A^2$ and supported by a spring, K, breeching-hooks G with movable bars H, singletree with hooks E, provided with movable bars F, cords connecting said movable bars with the vehicle-body, pulleys $A^3$ and $A^5$, guideways $A^4$, connecting-ring $A^5$, and handle B' for guiding and operating said cord, all constructed and operated substantially as shown, and for the purposes set forth.

In testimony whereof I affix my signature in presence of two witnesses.

PHILLIP GEYER.

Witnesses:
H. A. ZIEBER,
REINHARD RIEGER.